INVENTORS
HARRY G. KAUFFMAN
THOMAS F. SLOAN
HENRY W. ANGLE
BY
*Arthur Frederick*
ATTORNEY

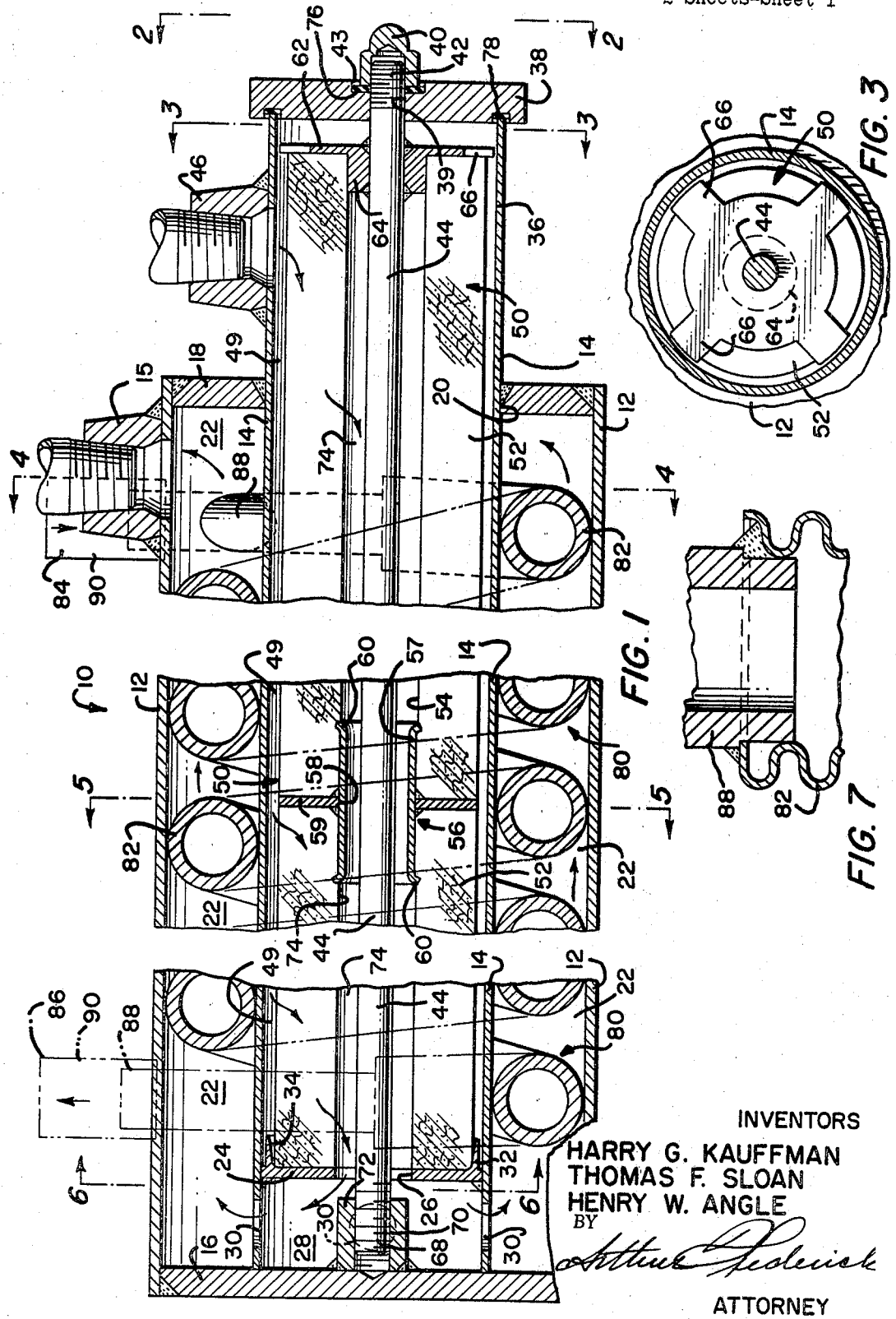

United States Patent Office 3,482,699
Patented Dec. 9, 1969

3,482,699
FILTER AND HEAT EXCHANGER
Harry G. Kauffman, Waynesboro, Thomas F. Sloan, Zullinger, and Henry W. Angle, Waynesboro, Pa., assignors to Frick Company, Waynesboro, Pa., a corporation of Pennsylvania
Filed June 14, 1967, Ser. No. 645,927
Int. Cl. B01d 35/18, 27/00
U.S. Cl. 210—184         5 Claims

ABSTRACT OF THE DISCLOSURE

The fluid cooling and filtering apparatus comprises an outer shell and an inner shell disposed coaxially within the outer shell and in spaced relationship with the latter to define an annular chamber. A filter cartridge is insertable and removable from one end of the inner shell. An inlet connection is attached to the inner shell for delivering fluid to be filtered and cooled for flow through the filter cartridge. A tube helically extending in the annular chamber is connected to receive cooling fluid and discharge heated cooling fluid therefrom. A passage means interconnects the inner shell with the annular chamber to provide for flow of filtrate to be cooled from the inner shell to the annular chamber where it flows in indirect heat exchange relationship with the cooling fluid flowing through the cooling tube. An outlet connection is attached to the outer shell to effect removal of the cooled filtrate from the annular chamber.

DISCLOSURE

This invention relates to heat exchanges and, more particularly, to a fluid filtering and cooling apparatus.

Heretofore, in refrigeration systems wherein oil must be filtered and cooled before being recirculated back into the compressor, separate filter and cooler units were employed with intrconnecting piping. The disadvantage of the use of separate units is the costliness of the units and the expense of installation. Another undesirable aspect of the conventional two unit application is that it contributes to the unattractive, cluttered appearance of an installation. In some devices incorporating heat exchange means with filtering means such as disclosed in U.S. Patents No. 2,294,107, to Beck and No. 1,659,136 to Cutting, require disconnection of at least one of the fluid flow connections to permit the removal and insertion of the filter member. Other prior art devices are disclosed in U.S. Patents No. 2,354,645 to Bateman, No. 2,432,475 to Griffith and No. 1,750,073 to Walsh.

Accordingly, it is an object of the present invention to provide a combined fluid filtering and cooling apparatus which is compact in construction and relatively simple to assemble.

It is another object of this invention to provide a fluid filtering and cooling apparatus wherein the filter may be easily and quickly removed and replaced without disturbing the fluid cooling connections.

It is a further object of the present invention to provide a fluid filtering and cooling apparatus of relatively large fluid capacity in relation to overall size.

A still further object of the present invention is to provide a fluid filtering and cooling apparatus in which a high heat exchange transfer is achieved.

In view of the foregoing, it is contemplated by the present invention to provide a filtering and cooling apparatus comprising an outer shell and an inner shell disposed coaxially within the outer shell and in spaced relationship with the latter to define an annular chamber. The inner shell is open at one end to receive therein a filter. The apparatus also includes a tube helically extending in the annular chamber, which tube is connected to receive cooling fluid from a suitable source thereof and connected to discharge heated cooling fluid for use, disposal or recirculation. An inlet connection communicating with the interior of the inner shell is provided for receiving fluid to be filtered and cooled. A passageway means is provided to communicate the interior of the inner shell with the annular chamber to provide for flow of filtrate to be cooled into the annular chamber. An outlet connection communicating with the annular chamber is provided to receive the cooled filtrate for passage to a point of use or storage.

The invention will be more fully understood from the following detailed description thereof when considered in connection with the accompanying drawings in which:

FIG. 1 is a longitudinal, cross sectional view taken along line 1—1 of FIG. 2 of a filtering and cooling apparatus according to this invention, somewhat enlarged;

FIGS. 3 to 6 inclusive, are cross sectional views taken substantially along lines 3—3, 4—4, 5—5 and 6—6 of FIG. 1; and FIG. 7 is a fragmentary cross sectional view of the joint between the tube and connector tube.

Figure 2:
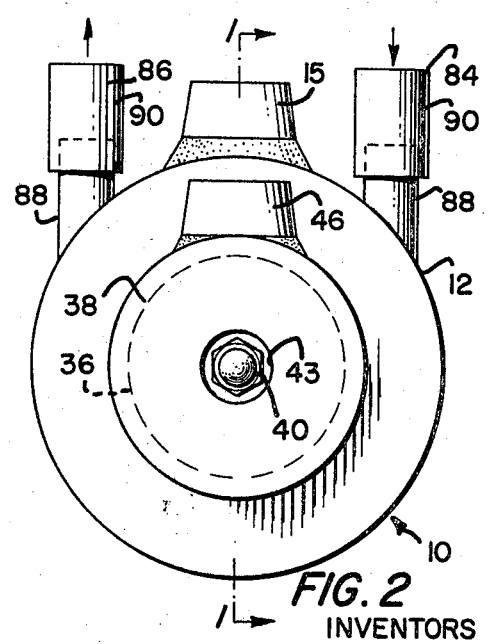
FIG. 2 is an end elevational view of the filtering and cooling apparatus of this invention as viewed from the right in FIG. 1, and on a somewhat smaller scale.

Now referring to the drawings and more specifically to FIGS. 1 and 2, the reference numeral 10 generally designates the fluid filtering and cooling apparatus according to this invention, which apparatus comprises an outer housing or shell 12 arranged in spaced, coaxial relation to an inner shell 14 with the interiors of the shells interconnected to provide for series flow of fluid to be filtered and cooled through the apparatus. Outer shell 12 is of cylindrical configuration and has an imperforate end wall 16 and an opposite end wall 18. End wall 18 is provided with a central opening 20 so dimensioned to receive snugly therethrough inner shell 14. An outlet connection 15 is attached to outer shell 12 adjacent end wall 18 to provide for discharge of heated cooling fluid.

Inner shell 14 is of smaller diameter than outer shell 12, but of longer length so as to project beyond end wall 18 with inner shell 14 in abutment against end wall 16. Inner shell 14 is secured to end wall 16 and 18 in a fluid-tight manner, as by welding or by any other suitable means, to form a fluid-tight annular chamber 22 defined between the inner surfaces of end walls 16 and 18 and the adjacent surfaces of outer shell 12 and inner shell 14. A bottom plate 24, having a central bore 26, is secured, as by welding, to the interior of inner shell 14 in spaced relationship with end wall 16 to thereby define a fluid transfer chamber 28. A plurality of circumferentially spaced openings 30 are provided in inner shell 14 to communicate the interior of inner shell 14, through chamber 28, with annular chamber 22. The bottom plate 24 has an annular flange 32 which has a tapered inner surface 34, the purpose of which will be explained hereinafter. The distal or projecting end portion 36 of inner shell 14 is closed by a cover plate 38 which is held in abutment against the end edge of inner shell 14 by an acorn type nut 40 turned upon the threaded end portion 42 of a support bolt 44. Cover plate 38 has a central bore 39 dimensioned to receive therethrough support bolt 44 and is counterbored at 43 to provide an annular shoulder against which acorn nut 40 abuts. An inlet connection 46 is connected to the projecting portion 36 of inner shell 14 to enable the apparatus to be connected to a source (not shown) of fluid to be filtered and cooled.

A filter assembly 50, which is herein illustrated as comprising two filter sections 52, may comprise one or more than two sections. Each filter section 52 preferably consists of compressed metallic wool or other suitable filter material formed in a cylindrical shape with a central, longitudinal bore 54. Where two or more filter sections are employed, the sections may be joined together by a connector element 56 consisting of a tube 57 secured in a central opening 58 of a plate 59 and projecting normal to the plane of the plate. The ends of tube 57 are flared at 60 to grip the filter sections. The filter assembly 50 is mounted on support bolt 44. The outside diameter of filter sections 52 is less than the inside diameter of inner shell 14 so that an annular flow passageway 49 is provided between the outer surface of the filter sections and the inner surface of shell 14.

To support one end of filter assembly 50, a plate 62, having a hub portion 64, is secured to support bolt 44 in close, spaced relation to threaded end 42 and, in assembled condition, closely spaced from cover plate 38. The plate 62 is provided with circumferentially, spaced, radially directed, projections 66 to engage the outer peripheral end of filter sections 52 without unduly restricting fluid flow in the filter section from the end thereof. The diameter of hub portion 64 of plate 62 is slightly smaller than longitudinal bore 54 of filter sections 52 so as to be slidably receivable into the bore. The opposite end of filter assembly 50 is supported by annular flange 32 of bottom plate 24.

The support bolt 44 is secured in apparatus 10 by turning threaded end portion 63 into a threaded opening 70 in end wall 16. As shown, threaded opening 70 may be provided by securing, as by welding, a nut 72 to the central portion of end wall 16. The diameter of bolt 44 is smaller than the diameter of the longitudinal bores 54 of filter sections 52 so as to define therebetween an annular flow passageway 74.

To effect a fluid tight seal between cover plate 38 and the end edge of inner shell 14, a gasket 78 is disposed in an annular groove in the cover plate so as to be between abutting surfaces of cover plate 38 and inner shell 14. The interstices between threaded end 42 of support bolt 44 and cover plate 38 is sealed by a gasket 76 disposed in counterbore 43 and by the use of an acorn type nut 40. A seal may be achieved in any other suitable manner, as for example, by disposing an O-ring in bore 39 of cover plate 38 at a point before threaded end portion 42 begins.

Figure 4:
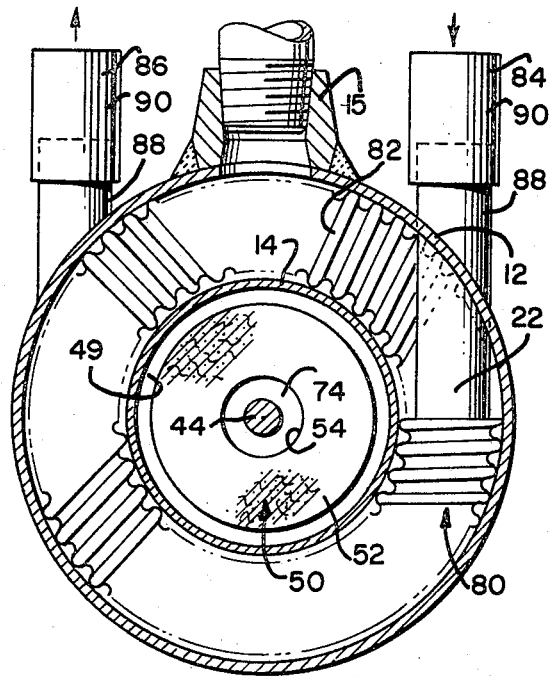
Figure 5:
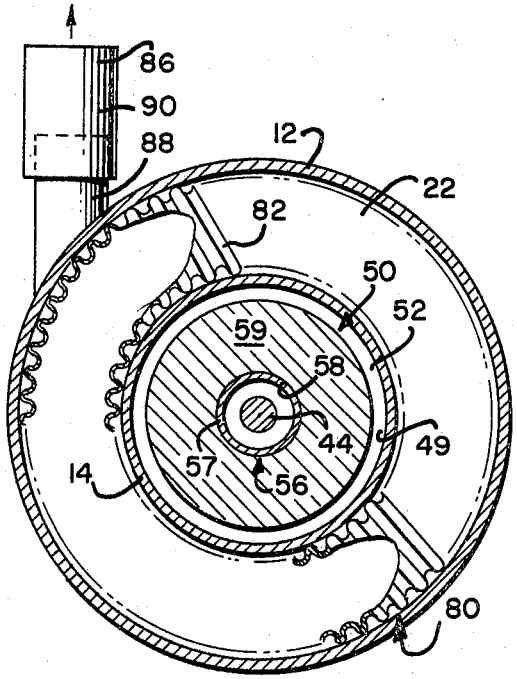
Figure 6:
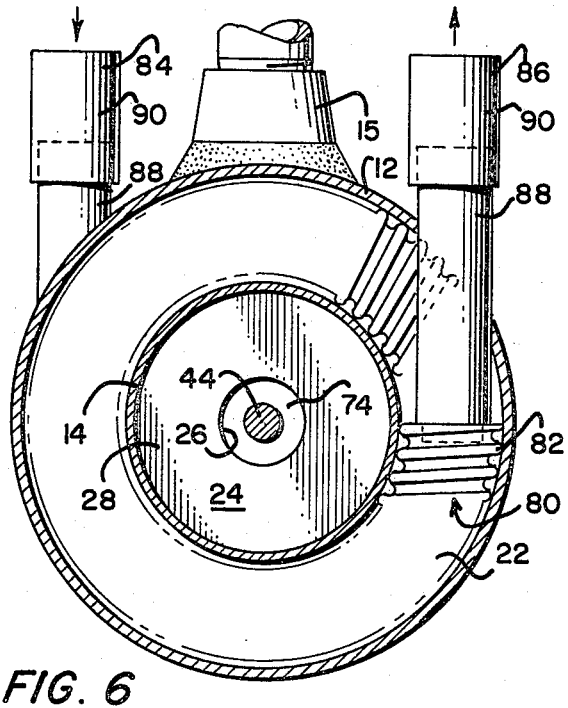

The heat transfer or exchange between the fluid to be filtered and cooled and a cooling fluid is provided by a tube bank 80 disposed in annular chamber 22. As shown, tube bank 80 preferably comprises a single tube 82 made of corrosive resistant material, such as stainless steel, helically wound about inner shell 14 with one end connected to an inlet connection 84 and the opposite end to an outlet connection 86. To proivde a maximum heat transfer surface and contact, tube 82 is preferably a thin walled tube crimped to form a wall consisting of helical lands and grooves, although the tube is shown in FIG. 1, solely for illustration purposes, as a relatively thick walled tube. This tube construction, as best shown in FIGS. 4 and 5 also facilitates wrapping the tube about inner shell 14. As shown in FIGS. 4, 6 and 7, inlet connection 84 and outlet connection 86 each includes a straight, relatively thick walled tube 88 secured at one end, as by welding, brazing or the like, to one end of tube 82. A pipe thread connection 90 is secured to the opposite distal end of tube 88. Each of tubes 88 is disposed to project tangentially to the helix of the tube through an opening in the wall of outer shell 12 and is secured in a fluid-tight manner, as by welding, to the outer shell at the opening. Inlet and outlet connections 84 and 86 are so arranged in relation to the direction of flow of fluid through chamber 22 that the cooling fluid flows in a countercurrent direction to the flow of fluid through chamber 22.

It has been found that improved heat transfer can be effected by selecting tube 82 of such diameter in relation to the cross sectional dimension of annular chamber 22 that the outer helical lands of the walls of tube 82 contact the inner surface of outer shell 12 and the outer surface of inner shell 14. This structural feature tends to cause the fluid to be cooled to follow a helical flow path around the tube. It also promotes greater heat transfer to inner shell 14 so that better precooling of the fluid to be filtered and cooled is achieved in its passage through inner shell 14.

In operation of filtering and cooling apparatus 10 herein described, fluid to be filtered and cooled enters through connection 46 into the interior of inner shell 14, and thereafter flows radially, inwardly, through filter sections 52, into annular passageway 74. Since apparatus 10 in normal operation is in a flooded condition, some of the fluid to be filtered and cooled flows varying distances along passageway 49 before entering and passing through the filter sections. From passageway 74, the filtered fluid passes into transfer chamber 28, through openings 30, into annular chamber 22. Thereafter, the filtered, but yet to be cooled, fluid flows through chamber 22 in indirect heat exchange relationship with cooling fluid flowing through tube 82, thereby cooling the fluid. The filtered and cooled fluid is discharged, after flowing through chamber 22, through outlet connection 15 to a source of use or storage (not shown).

Simultaneous with flow of fluid to be filtered and cooled into inner shell 14, cooling fluid enters tube 82 through inlet connection 84 and absorbs heat from the walls of tube 82 and is thereby heated. The heated cooling fluid is then discharged through outlet connection 86 to a cooling and recirculation means or discharged as waste.

To remove filter assembly 50 for purpose of inspection, repair or replacement, apparatus 10 is first isolated from the sources (not shown) of cooling fluid and fluid to be filtered and cooled and other equipment by the closing of valves (not shown). Thereafter, nut 40 is removed from support bolt 44 and cover plate 38 is slipped from the end of the support bolt. Support bolt 44 is then turned to disengage the threaded opening 70 in end wall 16. With the bolt disconnected from the end wall 16, it is axially withdrawn from inner shell 14. Since filter assembly 50 is supported on support bolt 44 it may retract with support bolt 44, but if not, the filter assembly can be readily removed separately from inner shell 14.

After inspection, cleaning, repair or replacement of filter sections 52, support bolt 44 is first passed through the aligned bore 54 of the filter sections so that hub 64 fits within the end of bore 54. The assembly is then inserted into inner shell 14 and support bolt 44 turned to thread end portion 68 into threaded opening 70 in end wall 16. The tapered surfaces 34 of flange 32 of plate 24 cams the inner end of the filter assembly 50 into proper coaxial relationship with support bolt 44 in the event of any slight misalignment. Thereafter, cover plate 38 is passed on the bolt and into abutment against the end edge of inner shell 14. The nut 40 is then turned upon end portion 42 of support bolt 44 to draw the cover plate into fluid-tight abutment against inner shell 14. The valves (not shown) are then opened to restore flow of fluid to be filtered and cooled and cooling fluid to the apparatus.

It is believed now readily apparent that a filtering and cooling apparatus has been disclosed which is relatively simple and compact in construction. It is an apparatus in which the filter assembly can be quickly and easily removed and replaced without disturbing the fluid connections to the apparatus. It is also an apparatus in which a high degree of heat transfer is effected so that a relatively small apparatus in overall size is capable of relatively large fluid capacity. Furthermore, it is an apparatus in which the fluid is being precooled at it is being filtered.

Although but one embodiment has been illustrated and described in detail, it is to be expressly understood that the invention is not limited thereto. Various changes can be made in the arrangement of parts without departing from

What is claimed is:

1. A combination filter and heat exchanger comprising an outer shell having a closure secured in each end, an inner shell within said outer shell having one end abutting the closure in one end of the outer shell and its opposite end projecting through the closure in the opposite end of the outer shell, a tube bank between said inner and outer shells in contact with each, the inner shell having an inlet thereinto through the portion projecting through the end of the outer shell and having an outlet from its opposite end portion into said outer shell, said outer shell having a discharge from its end portion adjacent its end closure through which the inner shell projects, a removable closure for the projecting end portion of the inner shell, means for fastening said removable closure in place but permitting it to be readily removed for affording ready access to the interior of said inner shell and ready removal and replacement of a filter, a thick-walled sleeve-type filter for location within said inner shell, said filter having an external diameter slightly less than the internal diameter of said inner shell and having an internal diameter substantially smaller than its external diameter, a partition within said inner shell with a central opening corresponding in size to that of the internal diameter of said filter for limiting flow to its remote side only from the interior surface of said filter, said filter adapted to have one end engage said partition, a closure for the other end of said filter, whereby fluid admitted into said inner shell about the exterior of said filter will be required to pass through the wall of said filter before it can pass through the opening in said partition and into said outer shell and along and between the coils of said tube bank.

2. The device of claim 1 in which said heat exchanger is of a kind employed in the reduction of temperature.

3. The device of claim 1 in which said tube bank is of corrugated wall construction to increase the heat exchange surface.

4. The device of claim 1 in which said heat exchanger includes a relatively thin wall tube having lands and grooves and disposed helically within said chamber.

5. The device of claim 1 in which said tube bank and its inlet and outlet connections are arranged so that the flow therein is counter to the flow of fluid through said filter.

References Cited

UNITED STATES PATENTS

| | | | |
|---|---|---|---|
| 2,439,463 | 4/1948 | Gebauer | 210—186 X |
| 2,525,000 | 10/1950 | Seligman et al. | 165—119 X |
| 2,952,141 | 9/1960 | Nelson et al. | 165—66 X |
| 2,820,615 | 1/1958 | Peters. | |
| 2,829,775 | 4/1958 | Krogman | 210—186 |
| 2,354,645 | 8/1944 | Bateman | 210—184 |

REUBEN FRIEDMAN, Primary Examiner

T. A. GRANGER, Assistant Examiner